(12) United States Patent
Chen et al.

(10) Patent No.: US 10,917,207 B2
(45) Date of Patent: Feb. 9, 2021

(54) METHOD AND DEVICE FOR CONFIGURING AND ACQUIRING TRANSMISSION PARAMETERS OF PHYSICAL LAYER

(71) Applicant: ZTE CORPORATION, Shenzhen (CN)

(72) Inventors: Yijian Chen, Shenzhen (CN); Zhaohua Lu, Shenzhen (CN); Yu Ngok Li, Shenzhen (CN); Hao Wu, Shenzhen (CN)

(73) Assignee: ZTE CORPORATION, Guangdong (CN)

(*) Notice: Subject to any disclaimer, the term of this patent is extended or adjusted under 35 U.S.C. 154(b) by 0 days.

(21) Appl. No.: 16/313,070

(22) PCT Filed: Jun. 23, 2017

(86) PCT No.: PCT/CN2017/089863
§ 371 (c)(1),
(2) Date: Dec. 24, 2018

(87) PCT Pub. No.: WO2017/220029
PCT Pub. Date: Dec. 28, 2017

(65) Prior Publication Data
US 2019/0222374 A1   Jul. 18, 2019

(30) Foreign Application Priority Data
Jun. 23, 2016 (CN) .......................... 2016 1 0465728

(51) Int. Cl.
*H04L 5/00*  (2006.01)
*H04W 72/00*  (2009.01)
*H04W 72/04*  (2009.01)

(52) U.S. Cl.
CPC .............. *H04L 5/0032* (2013.01); *H04L 5/00* (2013.01); *H04L 5/0007* (2013.01);
(Continued)

(58) Field of Classification Search
None
See application file for complete search history.

(56) References Cited

U.S. PATENT DOCUMENTS 10,568,096 B2 * 2/2020 Wang ..................... H04L 5/0055
2009/0092086 A1 * 4/2009 Lee ....................... H04B 7/2615
370/329
(Continued)

FOREIGN PATENT DOCUMENTS

| CN | 105101307 A | 11/2015 |
| CN | 106793101 A | 5/2017 |

(Continued)

OTHER PUBLICATIONS

Samsung, "Framework for Multiplexing Verticals in NR", 3GPPTSG RAN WG1 #85, R1-164001., May 27, 2016 (May 27, 2016), chapter3, 4 pgs.
(Continued)

*Primary Examiner* — Chi H Pham
*Assistant Examiner* — Vladislav Y Agureyev
(74) *Attorney, Agent, or Firm* — Li & Cai Intellectual Property (USA) Office

(57) ABSTRACT

Provided herein are method and device for configuring and acquiring transmission parameters of physical layer, the method comprising: dividing transmission resources into N resource groups, where N is greater than or equal to 1; determining first type of transmission parameter of the physical layer, the first type of transmission parameter of the physical layer comprises at least one of: indication information on definitions of basic resource units, indication information on aggregation of time interval units of physical layers, information on parameter configuration of basic transmission structures, information on numerology parameter configuration, indication information on mapping of channel or signals, indication information on resource allo- (Continued)

cation methods, indication information on available bandwidths in frequency domain of resource groups, indication information on transmission powers of resources, and configuration information of measurement pilots; notifying receiving terminal of the first type of transmission parameters of the physical layer corresponding to the N resource groups.

18 Claims, 22 Drawing Sheets

(52) U.S. Cl.
CPC ....... *H04W 72/005* (2013.01); *H04W 72/042* (2013.01); *H04L 5/0053* (2013.01)

(56) References Cited

U.S. PATENT DOCUMENTS

| | | | | |
|---|---|---|---|---|
| 2011/0098052 A1* | 4/2011 | Jung | ................... | H04W 72/005 455/450 |
| 2011/0305158 A1* | 12/2011 | Kim | ................... | H04W 72/005 370/252 |
| 2012/0044892 A1* | 2/2012 | Guan | ................. | H04W 72/121 370/329 |
| 2012/0163277 A1* | 6/2012 | Kim | ..................... | H04W 76/40 370/312 |
| 2013/0021981 A1* | 1/2013 | Huang | ................ | H04W 72/121 370/328 |
| 2014/0029584 A1* | 1/2014 | Qu | ..................... | H04W 72/042 370/336 |
| 2014/0307642 A1* | 10/2014 | Wanstedt | ............. | H04L 5/0094 370/329 |
| 2015/0257141 A1* | 9/2015 | Kulal | ................ | H04W 72/0406 370/329 |
| 2018/0206246 A1* | 7/2018 | Zhang | ................. | H04W 74/006 |
| 2018/0213513 A1* | 7/2018 | Sun | .......................... | H04J 11/00 |
| 2018/0279281 A1* | 9/2018 | Li | .......................... | H04W 72/04 |
| 2018/0295621 A1* | 10/2018 | Zeng | ................. | H04W 72/0453 |
| 2019/0069282 A1* | 2/2019 | Luo | ....................... | H04L 5/0085 |
| 2019/0222288 A1* | 7/2019 | Zhou | ................... | H04B 7/0408 |

FOREIGN PATENT DOCUMENTS

| | | |
|---|---|---|
| CN | 106850165 A | 6/2017 |
| WO | WO 2015099889 A1 | 7/2015 |

OTHER PUBLICATIONS

International Search Report in the international application No. PCT/CN2017/089863, dated Sep. 25, 2017, 2 pgs.
English Translation of the Written Opinion of the International Search Authority in the international application No. PCT/CN2017/089863, dated Sep. 25, 2017, 7 pgs.
European Patent Office, Patent search report dated Jun. 6, 2019 corresponding to EP Application No. 17814767.4.
Guangdong Oppo Mobile Telecom :"Frame structure supporting flexible parameter allocations", 3GPP Draft; R1-164472, 3rd Generation Partnership Project(3GPP), Mobile Competence Center; 650; Route Des Lucioles; F-06921SOPHIA-Antipolis Cedex, May 13, 2016, XP051096899, http://www.3gpp.org/ftp/tsg_ran/WG1_RL1/TSGR1_85/Docs.

* cited by examiner

METHOD AND DEVICE FOR CONFIGURING AND ACQUIRING TRANSMISSION PARAMETERS OF PHYSICAL LAYER

TECHNICAL FIELD

The disclosure relates to the field of communication, and in particular to a method and an apparatus for configuring and acquiring physical layer transmission parameters.

BACKGROUND

In radio communication, it is required to define multiple types of physical layer time interval units generally. Based on the physical layer time interval units, channel or signal mapping is defined and resources are scheduled. Each of the physical layer time interval units may be defined by using a fixed time length, and may also be defined by using multiple time domain symbols. To take a 4th-Generation (4G) radio communication system long term evolution (LTE) as an example, several types of physical layer time interval units are defined in a time domain, and a frame structure of each of the physical layer time interval units is fixed and described. FIG. 1 illustrates a schematic diagram of a frame structure of a frequency division dual (FDD) system in the related art. As illustrated in FIG. 1, a radio frame in the frequency division dual (FDD) system is 10 ms, and 10 subframes, 20 slots and 307,200 time domain sampling points (a basic sampling frequency of the LTE is 30.72 MHz) are included. For each subframe, generally, a physical layer is scheduled in units of subframes in the time domain.

FIG. 2 illustrates a schematic diagram of a frame structure of a time division duplex (TDD) system in the related art. As illustrated in FIG. 2, a frame of a time division duplex (TDD) is also defined as 10 ms, which is the same as that of the FDD. The frame includes 10 subframes and each of the subframes is also defined as 1 ms, which is the same as that of the FDD. Compared with the FDD, a half-frame of 5 ms is defined additionally. Each half-frame includes a special subframe. The special subframe includes three portions, i.e., a downlink pilot time slot (DwPTS) in a downlink resource portion, a guard period (GP) in a GP portion, and an uplink pilot time slot (upPTS) in an uplink resource portion. An LTE system supports a bandwidth of 1.4 MHz to 20 MHz on a frequency domain. No matter whether it is the FDD or the TDD, resource allocation is performed in units of resource blocks (RB) and one RB includes 12 sub-carriers generally.

FIG. 3 illustrates a schematic diagram of mapping of a channel in the related art. As illustrated in FIG. 3, for some channels in the physical layer, such as a physical downlink control channel (PDCCH), a physical downlink shared channel (PDSCH), an enhanced physical downlink control channel (EPDCCH), a physical downlink hybrid retransmission channel (PHICH), a physical layer broadcast (or multicast) channel (a physical broadcast channel), a primary synchronization channel (P-SCH), a supplementary synchronization channel (S-SCH), a physical control format indicator channel (PCFICH), a position mapping is described based on the subframe. Specific channel mapping is relevant to a subframe type. To take the subframe of a normal cyclic prefix (CP) of the FDD system as an example, the mapping of some main channels is as illustrated in FIG. 3.

For other types of subframes such as an extended CP subframe, positions of channels in the TDD subframe may be different from those in the above FIG. 3. However, in a same type of subframes, positions of channel mapping are fixed. Not all subframes are present for some channels, e.g., a transmission period of each of the physical layer broadcast (or multicast) channels (the physical broadcast channel), the P-SCH and the S-SCH is 5 ms. In addition, some channel areas may be adjusted, e.g., the number of symbols for the PDCCH and the PDSCH may be increased or decreased.

From the above, it may be seen that the LTE system has the following characteristics: lengths of multiple types of physical layer time interval units defined in an LTE protocol are fixed, e.g., time lengths of a frame and a subframe are respectively fixed at 10 ms and 1 ms, a time length of a half-frame is fixed at 5 ms, and a time length of a time slot is fixed at 0.5 ms, which are unchanged. A channel mapping manner of a physical layer is fixed, and for the PDCCH/EPDCCH/PDSCH and some pilot signals, the mapping manner is specified. A multiplexing relationship among channels (signals) is determined based on a type of the subframe.

Additionally, the LTE system further has the following limitations, e.g., resource allocation is based on system bandwidths, the system bandwidths are the same for user equipments (UEs) in a cell, and the resource allocation is performed for all UEs. Numerology of the physical layer is fixed, e.g., a sub-carrier spacing is 15 KHz, the number of points of fast fourier transform (FFT) is 2048, and a sub-carrier density is that an RB includes 12 sub-carriers. A basic resource allocation unit is one RB and is also fixed.

Concerning a problem that a first type of physical layer transmission parameters cannot be flexibly configured in the related art, an effective solution has not yet been proposed.

SUMMARY

The embodiments of the disclosure provide a method and an apparatus for configuring and acquiring physical layer transmission parameters to at least solve a problem that a first type of physical layer transmission parameters cannot be flexibly configured in the related art.

According to one embodiment of the disclosure, it is provided a method for configuring physical layer transmission parameters, which includes the following operations.

Transmission resources are divided into N resource groups, where N is greater than or equal to 1; a first type of physical layer transmission parameters are determined; and the first type of physical layer transmission parameters corresponding to the N resource groups are notified to a receiving terminal.

The first type of physical layer transmission parameters includes at least one of the following:

indication information on a definition of a basic resource unit;

indication information on aggregation of physical layer time interval units;

information on configuration parameters of a basic transmission structure;

numerology configuration information;

indication information on mapping of a channel or signal;

indication information on a manner of resource allocation;

indication information on an available bandwidth in a frequency domain of each of the resource groups;

indication information on a transmit power of a resource; or measurement pilot configuration information.

Preferably, the operation that the first type of physical layer transmission parameters corresponding to the N resource groups are notified to the receiving terminal may include the following action.

The first type of physical layer transmission parameters corresponding to the N resource groups are notified to the receiving terminal in physical layer broadcast or multicast channels; or, the first type of physical layer transmission parameters corresponding to the N resource groups are notified to the receiving terminal via higher layer signaling.

Preferably, the method may further include the following operations.

A first type of physical layer transmission parameters of a first cell or carrier are determined; and the first type of physical layer transmission parameters are notified to the receiving terminal on a second cell or communication carrier.

Preferably, the method may further include the following operation.

The first type of physical layer transmission parameters are indicated via sequence resources or time frequency resources used by a synchronization channel.

Preferably, each of the resource groups may be at least one of: a beam set, a virtual sector group, an antenna group, a port group, a time domain resource group or a frequency domain resource group.

A beam included in the beam set is: a transmit beam, a receive beam, or a pair of transmit and receive beams.

An antenna included in the antenna group is: a transmitting antenna, a receiving antenna, or a pair of transmitting and receiving antennas.

A virtual sector group included in the virtual sector group is: a virtual sending sector, a virtual receiving sector, or a pair of virtual sending and receiving sectors.

The time domain resource group is a group of physical layer time interval units, and includes one or more physical layer time intervals in a same type.

The frequency domain resource group is a sub-carrier group, a resource block group (RBG), or a subband group.

Preferably, the method may further include the following operations.

A transmitting terminal transmits M physical layer broadcast or multicast channels, where the physical layer broadcast or multicast channels are associated with the N resource groups, configuration information of the physical layer transmission parameters notified in the physical layer broadcast or multicast channels acts on associated resource groups, where N is greater than or equal to M, M is greater than or equal to 1, and each of M and N is an integer.

Preferably, the physical layer broadcast or multicast channels may include at least one of: indication information on division of the resource groups, or index information of corresponding resource groups at present.

Preferably, the indication information on the definition of the basic resource unit may include indication information on a granularity in a frequency domain, and indication information on a length or boundary of each of the physical layer time interval units.

Preferably, the indication information on the length of each of the time interval units may be indication information on an absolute time length, or may be indication information on a number of included orthogonal frequency division multiplexing (OFDM) symbols.

The indication information on the boundary may be indication information on at least one of a start position or an end position of each of the physical layer time interval units.

The indication information on the granularity in the frequency domain may include: indication information on a granularity of an RB, indication information on a granularity of the RBG, and indication information on a granularity of a subband.

Preferably, the indication information on the aggregation of the physical layer time interval units may include:

a number of one or more types of physical layer time interval units aggregated in transmission of a channel or signal in a physical layer.

Preferably, the numerology configuration information may include at least one of the following:

a length of a time domain symbol, a number of sub-carriers, a sub-carrier density, a sub-carrier spacing, a frequency domain guard band, a time domain guard time length, a length of a CP, or a number of points of FFT.

Preferably, the numerology configuration information may be numerology indication information for one or more types of channels.

Preferably, a configuration of the first type of physical layer transmission parameters may act within a predetermined time range, and the predetermined time range may include:

a physical layer time interval for a physical layer broadcast or multicast channel for notifying the first type of physical layer transmission parameters, where the physical layer time interval includes a time slot, a subframe, a half-frame or a frame.

Preferably, the information on the configuration parameters of the basic transmission structure may include:

indication information on allocation of downlink transmission resources, uplink transmission resources or a GP in one or more types of physical layer time interval units.

Preferably, the indication information on the mapping of the channel or signal may include:

indication information on a channel or signal content included in each of the physical layer time interval units.

Preferably, a transmit power in the indication information on the transmit power of the resource may be a transmit power of a resource included in each of the resource groups.

Preferably, the transmit power may be a transmit power of a channel or signal, or may be a transmit power of each of a part of included time domain resources, frequency domain resources, port resources, antenna resources, virtual sector group resources or beam resources.

Preferably, the indication information on the manner of the resource allocation may include at least one of:

allocation of frequency domain resources or allocation of time domain resources.

Preferably, the allocation of the time domain resources may include: allocation of symbol group level resources, allocation of time slot group level resources and subframe group level resources.

The allocation of the frequency domain resources includes: allocation of RB-level resources and allocation of RBG-level resources.

Preferably, the measurement pilot configuration information may include:

indication information on measurement pilot resources of each of the time interval units, where the measurement pilot resources include a port, a beam, time frequency resources and code resources;

a multiplexing manner of a measurement pilot of each of the time interval units; and a pilot power.

According to another aspect of the embodiments of the disclosure, it is further provided a method for acquiring physical layer transmission parameters, which includes the following operations.

N resource groups are determined, where N is greater than or equal to 1; and configuration signaling of a first type of physical layer transmission parameters corresponding to the N resource groups is received.

The first type of physical layer transmission parameters includes at least one of the following:

indication information on a definition of a basic resource unit;

indication information on aggregation of physical layer time interval units;

information on configuration parameters of a basic transmission structure;

numerology configuration information;

indication information on mapping of a channel or signal;

indication information on a manner of resource allocation;

indication information on an available bandwidth in a frequency domain of each of resource groups;

indication information on a transmit power of a resource; or measurement pilot configuration information.

Preferably, the operation that the first type of physical layer transmission parameters corresponding to the N resource groups are received may include the following action.

The first type of physical layer transmission parameters corresponding to the N resource groups are received in physical layer broadcast or multicast channels; or, the first type of physical layer transmission parameters corresponding to the N resource groups are acquired by detecting higher layer signaling.

Preferably, the method may further include the following operation.

The first type of physical layer transmission parameters corresponding to the N resource groups are received on a second cell or communication carrier.

Preferably, the method may further include the following operation.

Sequence resources or time frequency resources used for transmitting a synchronization signal are detected, and the first type of physical layer transmission parameters are determined according to the sequence resources or the time frequency resources used by the synchronization signal.

Preferably, each of the resource groups may be at least one of: a beam set, a virtual sector group, an antenna group, a port group, a time domain resource group or a frequency domain resource group.

A beam included in the beam set is: a transmit beam, a receive beam, or a pair of transmit and receive beams.

An antenna included in the antenna group is: a transmitting antenna, a receiving antenna, or a pair of transmitting and receiving antennas.

A virtual sector group included in the virtual sector group is: a virtual sending sector, a virtual receiving sector, or a pair of virtual sending and receiving sectors.

The time domain resource group is a group of physical layer time interval units, and includes one or more physical layer time intervals in a same type.

The frequency domain resource group is a sub-carrier group, an RBG, or a subband group.

Preferably, the method may further include the following operation.

A receiving terminal receives configuration information from M physical layer broadcast or multicast channels, where the physical layer broadcast or multicast channels are associated with the N resource groups, configuration information of the physical layer transmission parameters notified in the physical layer broadcast or multicast channels acts on associated resource groups, where N is greater than or equal to M, M is greater than or equal to 1, and each of M and N is an integer.

Preferably, the physical layer broadcast or multicast channel may include at least one of: indication information on division of the resource groups, or index information of corresponding resource groups at present.

Preferably, the indication information on the definition of the basic resource unit may include indication information on a granularity in a frequency domain, and indication information on a length or boundary of each of the physical layer time interval units.

Preferably, the indication information on the length of each of the time interval units may be indication information on an absolute time length or is indication information on a number of included orthogonal frequency division multiplexing (OFDM) symbols.

The indication information on the boundary is indication information on at least one of a start position or an end position of each of the physical layer time interval units.

The indication information on the granularity in the frequency domain includes: indication information on a granularity of an RB, indication information on a granularity of the RBG, and indication information on a granularity of a subband.

Preferably, the indication information on the aggregation of the physical layer time interval units may include:

a number of one or more types of physical layer time interval units aggregated in transmission of a channel or signal in a physical layer.

Preferably, the numerology configuration information may include at least one of the following:

a length of a time domain symbol, a number of sub-carriers, a sub-carrier density, a sub-carrier spacing, a frequency domain guard band, a time domain guard time length, a length of a CP, or a number of points of fast fourier transform (FFT).

Preferably, the numerology configuration information may be numerology indication information for one or more types of channels.

Preferably, the configuration of the first type of physical layer transmission parameters may act on a predetermined time range, and the predetermined time range may include:

a physical layer time interval for a physical layer broadcast or multicast channel for notifying the first type of physical layer transmission parameters, where the physical layer time interval includes a time slot, a subframe, a half-frame or a frame.

Preferably, the information on the configuration parameters of the basic transmission structure may include:

indication information on allocation of downlink transmission resources, uplink transmission resources or a GP in one or more types of physical layer time interval units.

Preferably, the indication information on the mapping of the channel or signal may include:

indication information on a channel or signal content included in each of the physical layer time interval units.

Preferably, a transmit power in the indication information on the transmit power of the resource may be a transmit power of a resource included in each of the resource groups.

Preferably, the transmit power may be a transmit power of a channel or signal, or may be a transmit power of each of a part of included time domain resources, frequency domain resources, port resources, antenna resources, virtual sector group resources or beam resources.

Preferably, the indication information on the manner of the resource allocation may include at least one of:

allocation of frequency domain resources or allocation of time domain resources.

Preferably, the allocation of the time domain resources may include: allocation of symbol group level resources, and allocation of time slot group level resources and subframe group level resources.

The allocation of the frequency domain resources includes: allocation of RB-level resources and allocation of RBG-level resources.

Preferably, the measurement pilot configuration information may include:

indication information on measurement pilot resources of each of the time interval units, where the measurement pilot resources include a port, a beam, time frequency resources and code resources;

a multiplexing manner of a measurement pilot of each of the time interval units; and a pilot power.

According to another aspect of the embodiments of the disclosure, it is further provided an apparatus for configuring physical layer transmission parameters, which includes a first determination module and a notification module.

The first determination module is configured to divide transmission resources into N resource groups, N being greater than or equal to 1, and determine a first type of physical layer transmission parameters.

The first type of physical layer transmission parameters includes at least one of the following:

indication information on a definition of a basic resource unit;

indication information on aggregation of physical layer time interval units;

information on configuration parameters of a basic transmission structure;

numerology configuration information;

indication information on mapping of a channel or signal;

indication information on a manner of resource allocation;

indication information on an available bandwidth in a frequency domain of each of resource groups;

indication information on a transmit power of a resource; or measurement pilot configuration information.

The notification module is configured to notify a receiving terminal of the first type of physical layer transmission parameters corresponding to the N resource groups.

According to a still another aspect of the embodiments of the disclosure, it is further provided an apparatus for acquiring physical layer transmission parameters, which includes a second determination module and a receiving module.

The second determination module is configured to determine N resource groups, where N is greater than or equal to 1.

The receiving module is configured to receive configuration signaling of a first type of physical layer transmission parameters corresponding to the N resource groups.

The first type of physical layer transmission parameters include at least one of the following:

indication information on a definition of a basic resource unit;

indication information on aggregation of physical layer time interval units;

information on configuration parameters of a basic transmission structure;

numerology configuration information;

indication information on mapping of a channel or signal;

indication information on a manner of resource allocation;

indication information on an available bandwidth in a frequency domain of each of resource groups;

indication information on a transmit power of a resource; or measurement pilot configuration information.

In the embodiments of the disclosure, the transmission resources are divided into the N resource groups, where N is greater than or equal to 1. The first type of physical layer transmission parameters are determined. The first type of physical layer transmission parameters include at least one of the following: the indication information on the definition of the basic resource unit, the indication information on the aggregation of the physical layer time interval units, the information on the configuration parameters of the basic transmission structure, the numerology configuration information, the indication information on the mapping of the channel or signal, the indication information on the manner of the resource allocation, the indication information on the available bandwidth in the frequency domain of each of the resource groups, the indication information on the transmit power of the resource; or the measurement pilot configuration information. The first type of physical layer transmission parameters corresponding to the N resource groups are notified to the receiving terminal. Therefore, the problem that the first type of physical layer transmission parameters cannot be flexibly configured in the related art is solved, thereby the parameters can be flexibly configured for different UEs.

BRIEF DESCRIPTION OF DRAWINGS

The accompanying drawings described here are intended to provide a further understanding of the disclosure, and form a part of the disclosure. The schematic embodiments and descriptions thereof are intended to explain the disclosure, and do not unduly limit the disclosure. In the drawings.

DETAILED DESCRIPTION

The disclosure will be described in details below with reference to the drawings and embodiments. It should be noted that, in the case of no conflict, the features in the embodiments and the embodiments in the present disclosure may be combined with each other.

It is to be noted that, the terms such as "first" and "second" in the specification, claims and the above accompanying drawings of the disclosure are only used to distinguish similar objects, and are not necessarily used to describe a specific order or a precedence order.

Figure 1:
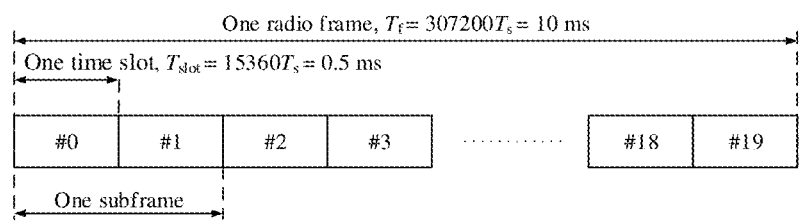
FIG. 1 illustrates a schematic diagram of a frame structure of an FDD system in the related art.
Figure 2:
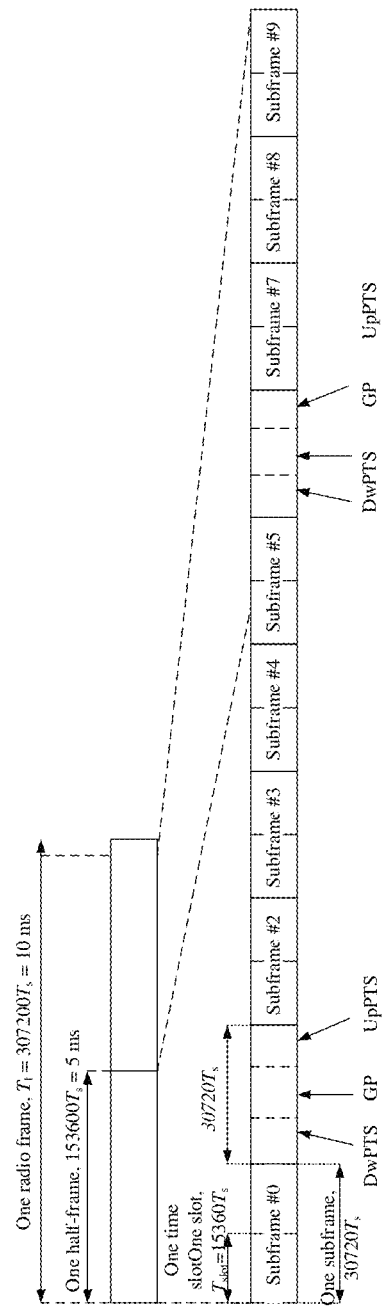
FIG. 2 illustrates a schematic diagram of a frame structure of a TDD system in the related art.
Figure 3:
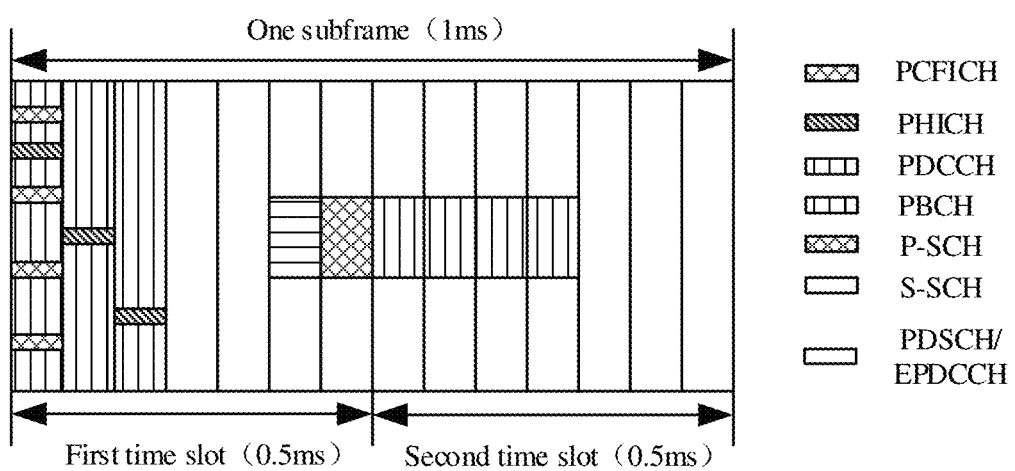
FIG. 3 illustrates a schematic diagram of mapping of a channel in the related art.
Figure 4:
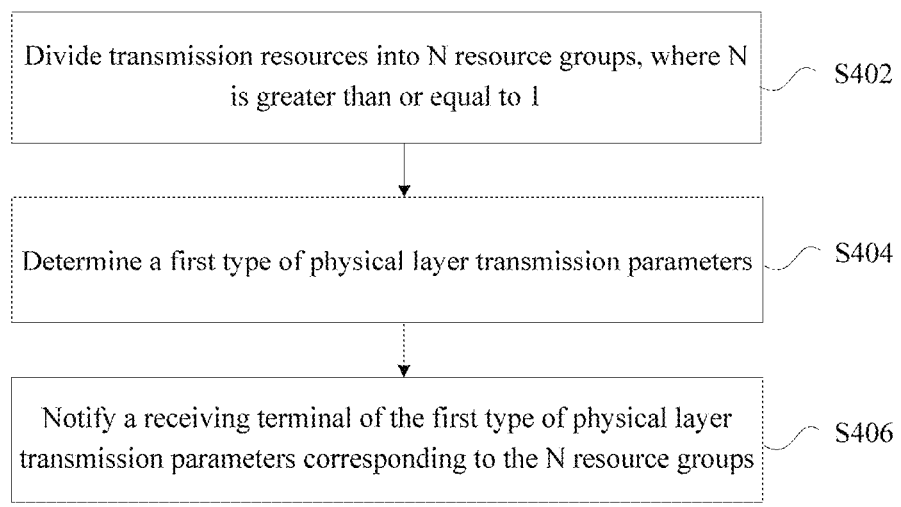
FIG. 4 illustrates a flowchart of a method for configuring physical layer transmission parameters according to an embodiment of the disclosure.

In this embodiment, it is provided a method for configuring physical layer transmission parameters. FIG. 4 illustrates a flowchart of a method for configuring physical layer transmission parameters according to an embodiment of the disclosure. As illustrated in FIG. 4, the process includes the following operations.

At block S402, transmission resources are divided into N resource groups, where N is greater than or equal to 1.

At block S404, a first type of physical layer transmission parameters are determined.

The first type of physical layer transmission parameters include at least one of the following:

indication information on a definition of a basic resource unit;

indication information on aggregation of physical layer time interval units;

information on configuration parameters of a basic transmission structure;

numerology configuration information;

indication information on mapping of a channel or signal;

indication information on a manner of resource allocation;

indication information on an available bandwidth in a frequency domain of each of the resource groups;

indication information on a transmit power of a resource; or measurement pilot configuration information.

At block S406, the first type of physical layer transmission parameters corresponding to the N resource groups are notified to a receiving terminal.

Preferably, the operation that the first type of physical layer transmission parameters corresponding to the N resource groups are notified to a receiving terminal may include the following action.

The first type of physical layer transmission parameters corresponding to the N resource groups are notified to the receiving terminal in physical layer broadcast or multicast channels; or, the first type of physical layer transmission parameters corresponding to the N resource groups are notified to the receiving terminal via higher layer signaling.

Preferably, the method may further include the following operations.

A first type of physical layer transmission parameters of a first cell or carrier are determined; and the first type of physical layer transmission parameters are notified to the receiving terminal on a second cell or communication carrier.

Preferably, the method may further include the following operation.

The first type of physical layer transmission parameters are indicated via sequence resources or time frequency resources used by a synchronization channel.

Preferably, each of the resource groups may be at least one of a beam set, a virtual sector group, an antenna group, a port group, a time domain resource group or a frequency domain resource group.

A beam included in the beam set is: a transmit beam, a receive beam, or a pair of transmit and receive beams.

An antenna included in the antenna group is: a transmitting antenna, a receiving antenna, or a pair of transmitting and receiving antennas.

A virtual sector groups included in the virtual sector group is: a virtual sending sector, a virtual receiving sector, or a virtual sending and receiving sector pair.

The time domain resource group is a group of physical layer time interval units, and includes one or more physical layer time intervals in a same type.

The frequency domain resource group is a sub-carrier group, an RBG, or a subband group.

Preferably, the method may further include the following operation.

A transmitting terminal transmits M physical layer broadcast or multicast channels, where the physical layer broadcast or multicast channels are associated with the N resource groups, configuration information of the physical layer transmission parameters notified in the physical layer broadcast or multicast channels acts on associated resource groups, where N is greater than or equal to M, M is greater than or equal to 1, and each of M and N is an integer.

Preferably, the physical layer broadcast or multicast channels may include at least one of: indication information on division of the resource groups, or index information of corresponding resource groups at present.

Preferably, the indication information on the definition of the basic resource unit may include indication information on a granularity in a frequency domain, and indication information on a length or boundary of each of the physical layer time interval units.

Preferably, the indication information on the length of each of the time interval units may be indication information on an absolute time length, or may be indication information on a number of included OFDM symbols.

The indication information on the boundary may be indication information on at least one of a start position or an end position of each of the physical layer time interval units.

The indication information on the granularity in the frequency domain may include: indication information on a granularity of an RB, indication information on a granularity of the RBG, and indication information on a granularity of a subband.

Preferably, the indication information on the aggregation of the physical layer time interval units may include:

a number of one or more types of physical layer time interval units aggregated in transmission of a channel or signal in a physical layer.

Preferably, the numerology configuration information may include at least one of the following:

a length of a time domain symbol, a number of sub-carriers, a sub-carrier density, a sub-carrier spacing, a frequency domain guard band, a time domain guard time length, a length of a CP, and a number of points of FFT.

Preferably, the numerology configuration information may be numerology indication information for one or more types of channels.

Preferably, a configuration of the first type of physical layer transmission parameters may act within a predetermined time range, and the predetermined time range may include:

a physical layer time interval for a physical layer broadcast or multicast channel for notifying the first type of physical layer transmission parameters, where the physical layer time interval includes a time slot, a subframe, a half-frame or a frame.

Preferably, the information on the configuration parameters of the basic transmission structure may include:

indication information on allocation of downlink transmission resources, uplink transmission resources or a GP in one or more types of physical layer time interval units.

Preferably, the indication information on the mapping of the channel or signal may include:

indication information on a channel or signal content included in each of the physical layer time interval units.

Preferably, a transmit power in the indication information on the transmit power of the resource may be a transmit power of a resource included in each of the resource groups.

Preferably, the transmit power may be a transmit power of a channel or signal, or may be a transmit power of each of a part of included time domain resources, frequency domain resources, port resources, antenna resources, virtual sector group resources or beam resources.

Preferably, the indication information on the manner of the resource allocation may include at least one of:

allocation of frequency domain resources or allocation of time domain resources.

Preferably, the allocation of the time domain resources may include: allocation of symbol group level resources, allocation of time slot group level resources and subframe group level resources.

The allocation of the frequency domain resources includes: allocation of RB-level resources and allocation of RBG-level resources.

Preferably, the measurement pilot configuration information may include:

indication information on measurement pilot resources of each of the time interval units, where the measurement pilot resources include a port, a beam, time frequency resources and code resources;

a multiplexing manner of a measurement pilot of each of the time interval units; and a pilot power.

Figure 5:
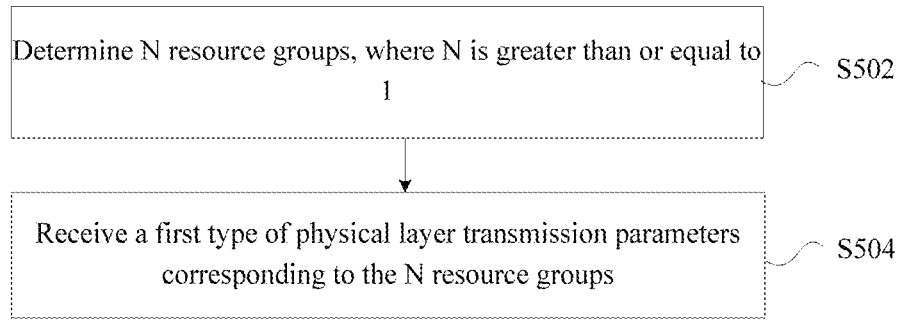
FIG. 5 illustrates a flowchart of a method for acquiring physical layer transmission parameters according to an embodiment of the disclosure.

In an embodiment of the disclosure, it is further provided a method for acquiring physical layer transmission parameters. FIG. 5 illustrates a flowchart of a method for acquiring physical layer transmission parameters according to an embodiment of the disclosure. As illustrated in FIG. 5, the process includes the following operations.

At block S502, N resource groups are determined, where N is greater than or equal to 1.

At block S504, a first type of physical layer transmission parameters corresponding to the N resource groups are received.

The first type of physical layer transmission parameters includes at least one of the following:

indication information on a definition of a basic resource unit;

indication information on aggregation of physical layer time interval units;

information on configuration parameters of a basic transmission structure;

numerology configuration information;

indication information on mapping of a channel or signal;

indication information on a manner of resource allocation;

indication information on an available bandwidth in a frequency domain of each of resource groups;

indication information on a transmit power of a resource; or measurement pilot configuration information.

Preferably, the operation that the first type of physical layer transmission parameters corresponding to the N resource groups are received may include the following action.

The first type of physical layer transmission parameters are received in physical layer broadcast or multicast channels; or, the first type of physical layer transmission parameters are acquired by detecting higher layer signaling.

Preferably, the method may further include the following operation.

The first type of physical layer transmission parameters are received on a second cell or communication carrier.

Preferably, the method may further include the following operation.

Sequence resources or time frequency resources used for transmitting a synchronization signal are detected, and the first type of physical layer transmission parameters are determined according to the sequence resources or the time frequency resources used by the synchronization signal.

Preferably, each of the resource groups may be at least one of: a beam set, a virtual sector group, an antenna group, a port group, a time domain resource group or a frequency domain resource group.

A beam included in the beam set is: a transmit beam, a receive beam, or a pair of transmit and receive beams.

An antenna included in the antenna group is: a transmitting antenna, a receiving antenna, or a pair of transmitting and receiving antennas.

A virtual sector groups included in the virtual sector group is: a virtual sending sector, a virtual receiving sector, or a pair of virtual sending and receiving sectors.

The time domain resource group is a group of physical layer time interval units, and includes one or more physical layer time intervals in a same type.

The frequency domain resource group is a sub-carrier group, an RBG, or a subband group.

Preferably, the method may further include the following operation.

A receiving terminal receives configuration information from M physical layer broadcast or multicast channels, where the physical layer broadcast or multicast channels are associated with the N resource groups, configuration information of the physical layer transmission parameters notified in the physical layer broadcast or multicast channels acts on associated resource groups, where N is greater than or equal to M, M is greater than or equal to 1, and each of M and N is an integer.

Preferably, the physical layer broadcast or multicast channels may include at least one of: indication information on division of the resource groups, or index information of corresponding resource groups at present.

Preferably, the indication information on the definition of the basic resource unit may include indication information on a granularity in a frequency domain, and indication information on a length or boundary of each of the physical layer time interval units.

Preferably, the indication information on the length of each of the time interval units may be indication information on an absolute time length or is indication information on a number of included OFDM symbols.

The indication information on the boundary is indication information on at least one of a start position or an end position of each of the physical layer time interval units.

The indication information on the granularity in the frequency domain includes: indication information on a granularity of an RB, indication information on a granularity of the RBG, and indication information on a granularity of a subband.

Preferably, the indication information on the aggregation of the physical layer time interval units may include:

a number of one or more types of physical layer time interval units aggregated in transmission of a channel or signal in a physical layer.

Preferably, the numerology configuration information may include at least one of the following:

a length of a time domain symbol, a number of sub-carriers, a sub-carrier density, a sub-carrier spacing, a frequency domain guard band, a time domain guard time length, a length of a CP, and a number of points of fast fourier transform (FFT).

Preferably, the numerology configuration information may be numerology indication information for one or more types of channels.

Preferably, the configuration of the first type of physical layer transmission parameters may act on a predetermined time range, and the predetermined time range may include:

a physical layer time interval for a physical layer broadcast or multicast channel for notifying the first type of physical layer transmission parameters, where the physical layer time interval includes a time slot, a subframe, a half-frame or a frame.

Preferably, the information on the configuration parameters of the basic transmission structure may include:

indication information on allocation of downlink transmission resources, uplink transmission resources or a GP in one or more types of physical layer time interval units.

Preferably, the indication information on the mapping of the channel or signal may include:

indication information on a channel or signal content included in each of the physical layer time interval units.

Preferably, a transmit power in the indication information on the transmit power of the resource may be a transmit power of a resource included in each of the resource groups.

Preferably, the transmit power may be a transmit power of a channel or signal, or may be a transmit power of each of a part of included time domain resources, frequency domain resources, port resources, antenna resources, virtual sector group resources or beam resources.

Preferably, the indication information on the manner of the resource allocation may include at least one of:

allocation of the frequency domain resources or allocation of the time domain resources.

Preferably, the allocation of the time domain resources may include: allocation of symbol group level resources, and allocation of time slot group level resources and sub-frame group level resources.

The allocation of the frequency domain resources includes: allocation of RB-level resources and allocation of RBG-level resources.

Preferably, the measurement pilot configuration information may include:

indication information on measurement pilot resources of each of the time interval units, where the measurement pilot resources include a port, a beam, time frequency resources and code resources;

a multiplexing manner of a measurement pilot of each of the time interval units; and a pilot power.

Figure 6:
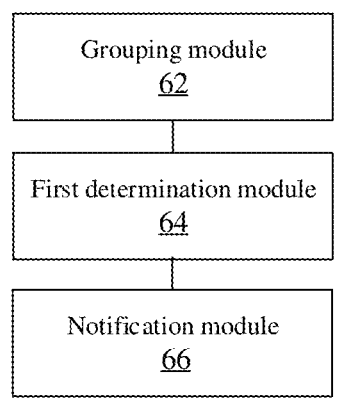
FIG. 6 illustrates a flowchart of an apparatus for configuring physical layer transmission parameters according to an embodiment of the disclosure.

In the embodiment of the disclosure, it is further provided an apparatus for configuring physical layer transmission parameters. FIG. 6 illustrates a flowchart of an apparatus for configuring physical layer transmission parameters according to the embodiment of the disclosure. As illustrated in FIG. 6, the apparatus includes a first determination module 64 and a notification module 66.

The first determination module 64 is configured to divide transmission resources into N resource groups, N being greater than or equal to 1, and determine a first type of physical layer transmission parameters.

The first type of physical layer transmission parameters includes at least one of the following:

indication information on a definition of a basic resource unit;

indication information on aggregation of physical layer time interval units;

information on configuration parameters of a basic transmission structure;

numerology configuration information;

indication information on mapping of a channel or signal;

indication information on a manner of resource allocation;

indication information on an available bandwidth in a frequency domain of each of resource groups;

indication information on a transmit power of a resource; or measurement pilot configuration information.

The notification module 66 is configured to notify a receiving terminal of the first type of physical layer transmission parameters corresponding to the N resource groups.

Figure 7:
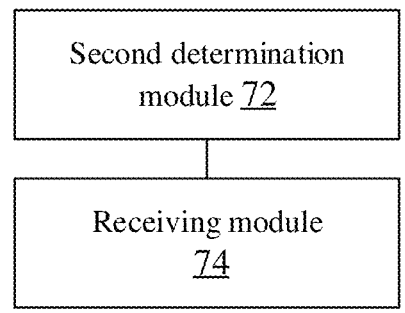
FIG. 7 illustrates a flowchart of an apparatus for acquiring physical layer transmission parameters according to an embodiment of the disclosure.

In the embodiment of the disclosure, it is further provided an apparatus for acquiring physical layer transmission parameters. FIG. 7 illustrates a flowchart of an apparatus for acquiring physical layer transmission parameters according to the embodiment of the disclosure. As illustrated in FIG.

7, the apparatus may include a second determination module 72 and a receiving module 74.

The second determination module 72 is configured to determine N resource groups, where N s greater than or equal to 1.

The receiving module 74 is configured to receive a first type of physical layer transmission parameters corresponding to the N resource groups.

The first type of physical layer transmission parameters include at least one of the following:

indication information on a definition of a basic resource unit;

indication information on aggregation of physical layer time interval units;

information on configuration parameters of a basic transmission structure;

numerology configuration information;

indication information on mapping of a channel or signal;

indication information on a manner of resource allocation;

indication information on an available bandwidth in a frequency domain of each of resource groups;

indication information on a transmit power of a resource; or measurement pilot configuration information.

An embodiment of the disclosure further provides a storage medium. Optionally, in this embodiment, the storage medium may be configured to store a program code for executing the following operations.

At block S1, transmission resources are divided into N resource groups, where N is greater than or equal to 1.

At block S2, a first type of physical layer transmission parameters are determined.

The first type of physical layer transmission parameters include at least one of the following:

indication information on a definition of a basic resource unit;

indication information on aggregation of physical layer time interval units;

information on configuration parameters of a basic transmission structure;

numerology configuration information;

indication information on mapping of a channel or signal;

indication information on a manner of resource allocation;

indication information on an available bandwidth in a frequency domain of each of the resource groups;

indication information on a transmit power of a resource; or measurement pilot configuration information.

At S3, the first type of physical layer transmission parameters corresponding to the N resource groups are notified to a receiving terminal.

Optionally, in this embodiment, the above storage medium may include but may be not limited to: various media capable of storing the program code such as a U disk, a read-only memory (ROM), a random access memory (RAM), a portable hard disk, a magnetic disk or an optical disk.

In the embodiment of the disclosure, the first type of physical layer transmission parameters are configured by the physical layer broadcast (or multicast) channels, so that the parameters may be changed in the time domain. Besides, different first types of physical layer transmission parameters may be used by each virtual sector group/port/beam, so that parameters corresponding to different ports, antennas, virtual sector groups and beams in a space domain are different, time frequency resource groups may be different, and the first types of physical layer transmission parameters corresponding to different UE groups are different, thereby the flexibility of physical layer transmission is enhanced. The embodiments of the disclosure will be further described below by specific embodiments.

First Embodiment

In a design of a 5th-Generation (5G) new radio, due to different services and different moving speeds, physical layer time interval units may no longer be defined by a base station from a level of a whole cell. In order to improve the flexibility and cause a length of each of the physical layer time interval units to be variable in a time domain, indication information on the length of each of the physical layer time interval units may be notified in a physical layer broadcast (or multicast) channel FIG. 8 illustrates a schematic diagram of transmission of a physical layer broadcast or multicast channel in the related art.

Figure 8:
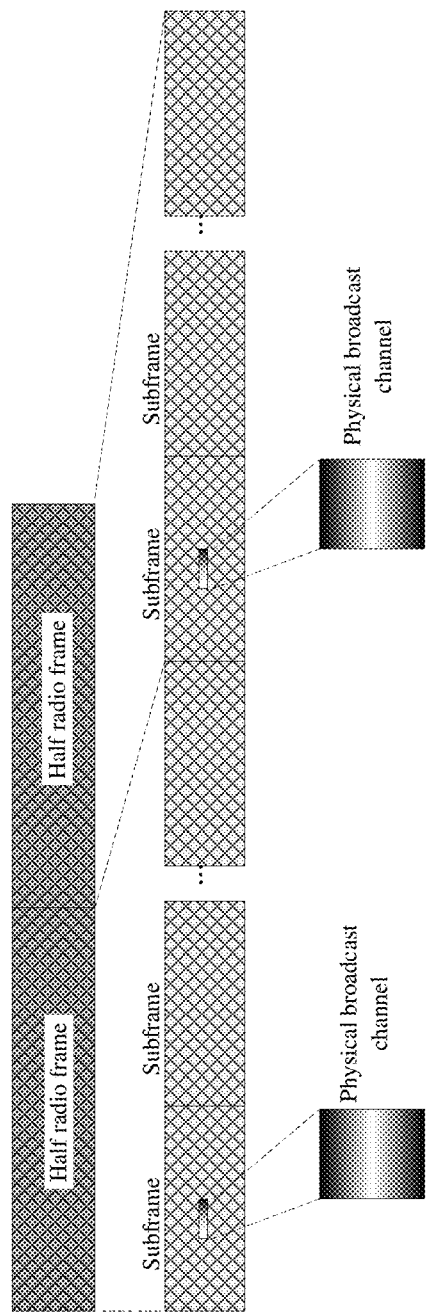
FIG. 8 illustrates a schematic diagram of transmission of a physical layer broadcast or multicast channel in the related art.

As illustrated in FIG. 8, via signaling of the physical layer broadcast (or multicast) channel, the length of the physical layer time interval unit in which the physical layer broadcast (or multicast) channel is located (e.g, a located time slot, a located subframe, a located radio half-frame, or a located radio frame) may be configured. There are various optional configurations, e.g., a length of the subframe may be 0.5 ms/1 ms/2 ms or the like. Herein, the length of the physical layer time interval unit may be an absolute time length, and may also be a relative time length. For example, the subframe may be 14 OFDM symbols, 28 OFDM symbols, 7 OFDM symbols or the like. Since the length of each of the OFDM symbols is affected by a length of a CP and a sub-carrier parameter, the time length of one subframe is not an absolute value. For other types of physical layer time interval units such as the time slot, the half-frame and the radio frame, a similar configuration method may also be adopted. In the method, it may support that different physical layer broadcast (or multicast) channels carry different configuration information, and a definition of the length of each of the physical layer time interval units is changed in different time periods, so as to meet different service demands and moving speeds, thereby the communication delay problem and the resource efficiency are optimized.

In the disclosure, it may also support that each of the physical layer time interval units is defined by using a virtual sector group level, a port level and a beam level. In this case, as the physical layer time interval units corresponding to different sectors, ports and beams are different, the notification may be performed by using multiple physical layer broadcast (or multicast) channels. The physical layer broadcast (or multicast) channels are respectively associated with different sectors, ports and beams.

Figure 9:
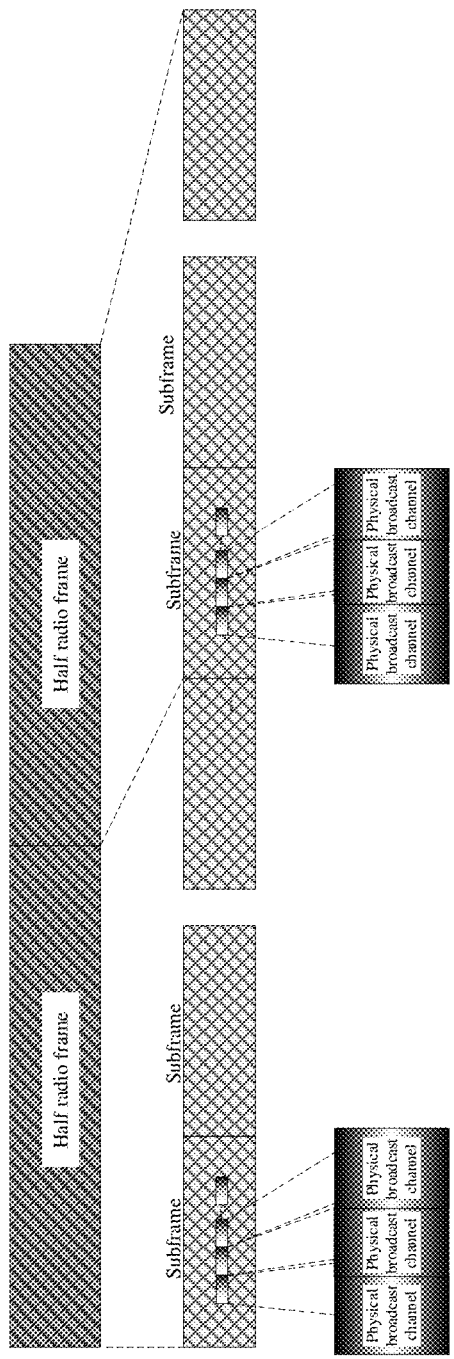
FIG. 9 illustrates a first schematic diagram of transmission of a physical layer broadcast or multicast channel according to an embodiment of the disclosure.
Figure 10:
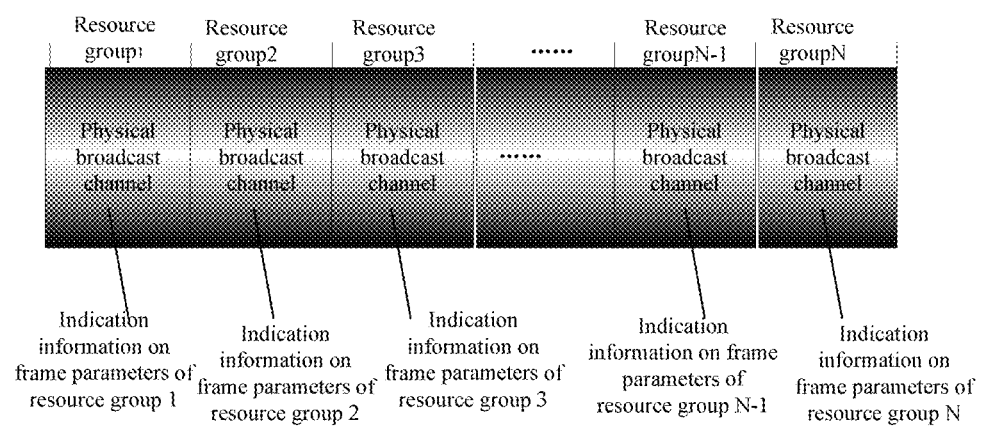
FIG. 10 illustrates a second schematic diagram of transmission of a physical layer broadcast or multicast channel according to an embodiment of the disclosure.

FIG. 9 illustrates a first schematic diagram of transmission of a physical layer broadcast or multicast channel according to an embodiment of the disclosure. As illustrated in FIG. 9, groups including multiple synchronization signals and the physical layer broadcast or multicast channels are transmitted by using multiple ports, or groups including multiple synchronization signals and the physical layer broadcast (or multicast) channels are transmitted by using multiple beams, and groups including multiple synchronization signals and the physical layer broadcast (or multicast) channels are transmitted by using multiple virtual sector groups. Lengths of the physical layer time interval units corresponding to different sectors, ports, beams and antennas may be different. FIG. 10 illustrates a second schematic diagram of transmission of a physical layer broadcast or multicast channel according to an embodiment of the disclosure.

As illustrated in FIG. 10, in the above embodiment, each of the resource groups may be a virtual sector group/a sending port group/a receiving antenna group/a beam set, etc.

| Sending port group 1 | Length of first type of physical layer time interval unit: a1 | Length of second type of physical layer time interval unit: a2 |
|---|---|---|
| Sending port group 2 | Length of first type of physical layer time interval unit: b1 | Length of second type of physical layer time interval unit: b2 |
| ... | | |
| Sending port group X | Length of first type of physical layer time interval unit: x1 | Length of second type of physical layer time interval unit: x2 |

Or

| Receiving antenna group 1 | Length of first type of physical layer time interval unit: a3 | Length of second type of physical layer time interval unit: a4 |
|---|---|---|
| Receiving antenna group 2 | Length of first type of physical layer time interval unit: b3 | Length of second type of physical layer time interval unit: b4 |
| ... | | |
| Receiving antenna group X | Length of first type of physical layer time interval unit: x3 | Length of second type of physical layer time interval unit: x4 |

Or

| Beam set 1 | Length of first type of physical layer time interval unit: a5 | Length of second type of physical layer time interval unit: a6 |
|---|---|---|
| Beam set 2 | Length of first type of physical layer time interval unit: b5 | Length of second type of physical layer time interval unit: b6 |
| ... | | |
| Beam set X | Length of first type of physical layer time interval unit: x5 | Length of second type of physical layer time interval unit: x6 |

Herein, the beam may be a transmit beam or a receive beam; or

| Virtual sector group 1 | Length of first type of physical layer time interval unit: a7 | Length of second type of physical layer time interval unit: a8 |
|---|---|---|
| Virtual sector group 2 | Length of first type of physical layer time interval unit: b7 | Length of second type of physical layer time interval unit: b8 |
| ... | | |
| Virtual sector group X | Length of first type of physical layer time interval unit: x7 | Length of second type of physical layer time interval unit: x8 |

Herein, the port group may include one or more ports. The virtual sector group may include one or more virtual sector groups. The antenna group may include one or more antennas. The beam set may include one or more beams.

Herein, each of the antennas may be a transmitting antenna or a receiving antenna. Each of the beams may be a transmit beam or a receive beam, and may be a baseband beam and may also be a radio-frequency beam. In addition, the difference in the beam generally means the difference in precoding. In this sense, the beam set may also be a precoding group.

Figure 11:
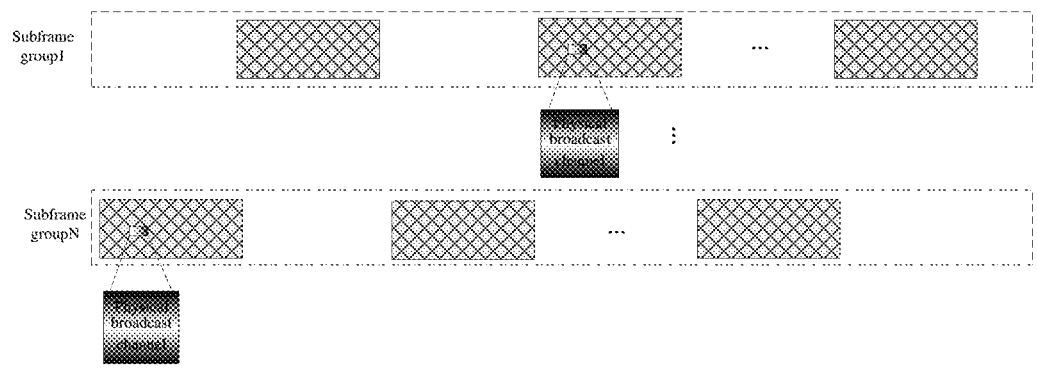
FIG. 11 illustrates a third schematic diagram of transmission of a physical layer broadcast or multicast channel according to an embodiment of the disclosure.

FIG. 11 illustrates a third schematic diagram of transmission of a physical layer broadcast or multicast channel according to an embodiment of the disclosure. As illustrated in FIG. 11, in the embodiment of the disclosure, different space domain resources further have different definitions of a physical layer time interval unit in a time domain. In this embodiment, configuration parameters not only act on a subframe/time slot/half-frame/radio frame where each of the physical layer broadcast (or multicast) channels is located, but also act on an agreed subframe group or a time slot group; or, the agreed action range is a time slot, a subframe, a half-frame and a radio frame before the configuration parameters of the length of each of the physical layer time interval units are received in a next time.

In another case, the transmission of the physical layer broadcast (or multicast) channel may be bound to some time frequency resource groups. Taking the time domain resources as an example, a physical layer broadcast (or multicast) channel 1 may be associated with a subframe group 1, a physical layer broadcast (or multicast) channel 2 may be associated with a subframe group 2, and so on, a physical layer broadcast (or multicast) channel N may be associated with a subframe group N.

In this case, subframe grouping information is notified in a physical layer broadcast (or multicast) channel i. Id information of a subframe group further notifies a length of a subframe or time slot and the like in the subframe group. The frequency domain resources are grouped similarly. For example, multiple RBs are divided as a group 1 binding to the physical layer broadcast (or multicast) channel 1, and other RBs are divided as a group 2 binding to the physical layer broadcast (or multicast) channel 2, and so on, different physical layer broadcast (or multicast) channels indicate subframe boundaries corresponding to the RBs. Besides the RB group, the frequency domain may further be a subcarrier group or a subband group. In this way, the definitions of the subframes in different frequency domain resource groups are different and are used in different transmission services, and such the flexibility does not exist in the related art. In physical layer broadcast (or multicast) channels corresponding to multiple resource groups, configuration information and index information of corresponding resource groups at present are further notified. The N resource groups may be defined in the configuration information of the resource group, and by the notification of the index information, a resource group corresponding to each of the physical layer broadcast (or multicast) channels may be clearly known.

It is pointed that in the above embodiment that the physical layer broadcast (or multicast) channel i may be bound to various types of resource groups. Herein, the resources may be beam resources, port resources, virtual sector group resources, time frequency resources and antenna resources. In other words, the various types may be combined to define the resource groups. A beam included in the beam set is a transmit beam/a receive beam/a pair of transmit and receive beams. Each of antennas included in the antenna group is a transmitting antenna/a receiving antenna/a pair of transmitting and receiving antennas. Each of virtual sector groups included in the virtual sector group is a virtual sending sector/a virtual receiving sector/a virtual sending and receiving sector pair.

Second Embodiment

In the first embodiment, the information on the configuration parameters of each of the physical layer time interval units may also be indication information on a boundary of each of the physical layer time interval units. Herein, the indication information on the boundary of each of the physical layer time interval units includes the following typical types.

Time Slot or Subframe Boundary:

After the synchronization is finished and a physical layer broadcast (or multicast) channel is detected, a start position of a current time slot or subframe may be indicated, e.g., x symbols before the synchronization signal, and an end position is a yth symbol after a last symbol of the physical layer broadcast (or multicast) channel, where the x and the y are natural numbers. A manner of indicating an absolute time may also be adopted, e.g., X ms before the synchronization signal, and the end portion is Y ms after the last symbol of the physical layer broadcast (or multicast) channel. The time slot or subframe boundary pertains to the subframe and the time slot.

Figure 12:
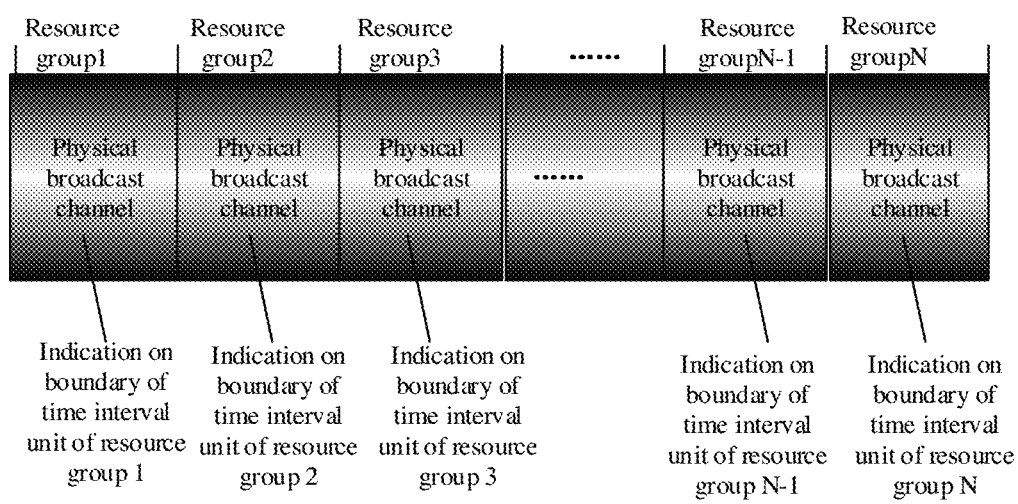
FIG. 12 illustrates a fourth schematic diagram of transmission of a physical layer broadcast or multicast channel according to an embodiment of the disclosure.

FIG. 12 illustrates a fourth schematic diagram of transmission of a physical layer broadcast or multicast channel according to an embodiment of the disclosure. As illustrated in FIG. 12, a radio frame boundary or a half-frame boundary indicates a position of a start subframe and a position of an end subframe of a radio frame or a half-frame.

Similar to the first embodiment, it is supported in the disclosure that indication information on a boundary of a cell-level physical layer time interval unit is notified directly. In addition, since the physical layer broadcast (or multicast) may be associated with different sector groups, port groups, beam sets, and antenna groups, it may further be supported that the indication information on the boundary of the physical layer time interval unit is notified by using a virtual sector group level, a port group level, a beam set level and an antenna group level.

In the above manner, in the disclosure, it is further implemented that different resource groups have different indication information on the boundaries of the physical layer time interval units. In this embodiment, configuration parameters not only act on a subframe/time slot/half-frame/radio frame where the physical layer broadcast (or multicast) channel is located, but also may act on an agreed subframe group or time slot group. Or, an agreed action range is a time slot, a subframe, a half-frame and a radio frame before the configuration parameters on the boundary of the physical layer time interval unit are received in a next time.

A terminal may obtains the parameters by receiving the cell-level physical layer broadcast (or multicast) channel or physical layer broadcast (or multicast) channels corresponding to multiple resource groups.

Third Embodiment

Figure 13:
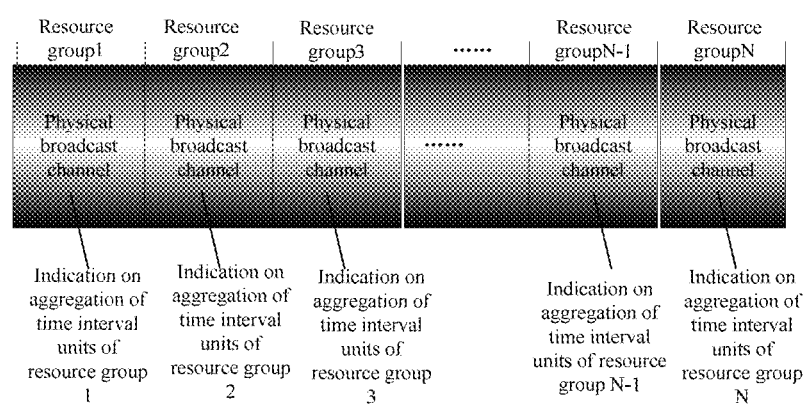
FIG. 13 illustrates a fifth schematic diagram of transmission of a physical layer broadcast or multicast channel according to an embodiment of the disclosure.

In the first embodiment, it is considered that a transmission channel or signal of the physical layer is defined based on one physical layer time interval unit. In this embodiment of the disclosure, it is further supported that the transmission channel or signal of the physical layer is defined by using aggregation of multiple physical layer time interval units. FIG. 13 illustrates a fifth schematic diagram of transmission of a physical layer broadcast or multicast channel according to an embodiment of the disclosure. The indication of aggregation parameters is as illustrated in FIG. 13. It further supports the indication of the aggregation parameters of a time interval unit at a resource group level.

The notification method is similar to that of the first embodiment. The transmission of the physical layer broadcast (or multicast) channel may also be bound to various resource groups. Multiple aggregation parameters may be provided for multiple physical layer time interval units, respectively corresponding to multiple resource groups.

In the above manner, in this embodiment of the disclosure, it is further implemented that different resource groups have different aggregation parameters of the physical layer time interval units. In this embodiment, configuration parameters not only act on a subframe/time slot/half-frame/radio frame where the physical layer broadcast (or multicast) channel is located, but also may act on an agreed subframe group or time slot group. Or, an agreed action range is a time slot, a subframe, a half-frame and a radio frame before the aggregation parameters are received in a next time.

A terminal may obtain the parameters by receiving the cell-level physical layer broadcast (or multicast) channel or physical layer broadcast (or multicast) channels corresponding to multiple resource groups.

Fourth Embodiment

Figure 14:
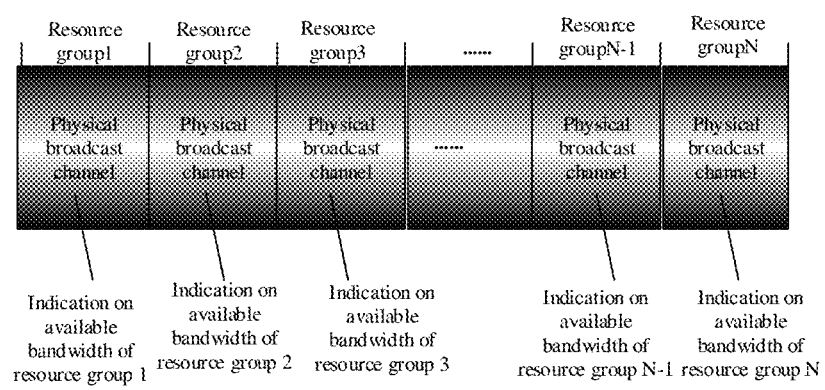
FIG. 14 illustrates a sixth schematic diagram of transmission of a physical layer broadcast or multicast channel according to an embodiment of the disclosure.

FIG. 14 illustrates a sixth schematic diagram of transmission of a physical layer broadcast or multicast channel according to an embodiment of the disclosure. As illustrated in FIG. 14, it is further supported in the disclosure that a corresponding available bandwidth is defined by using a virtual sector group level, a port group level, a beam set level, an antenna group level, a time frequency resource group level and a frequency domain resource group level. In order to support that different sector groups, port groups, beam sets and antenna groups, corresponding available bandwidths may be configured differently, the notification may be performed by using multiple physical layer broadcast (or multicast) channels. The physical layer broadcast (or multicast) channels are respectively associated with the different sector groups, port groups, beam sets, antenna groups, time domain resource groups and frequency domain resource groups.

In the above manner, it is further implemented in the disclosure that different resource groups have different available bandwidths. In this embodiment, configuration parameters not only act on a subframe/time slot/half-frame/radio frame where the physical layer broadcast (or multicast) channel is located, but also may act on an agreed subframe group or time slot group. Or, the agreed action range is a time slot, a subframe, a half-frame and a radio frame before the configuration parameters of the available bandwidth are received in a next time.

A terminal may acquire these numerologies by receiving the physical layer broadcast (or multicast) channels corresponding to multiple resource groups.

Fifth Embodiment

Figure 15:
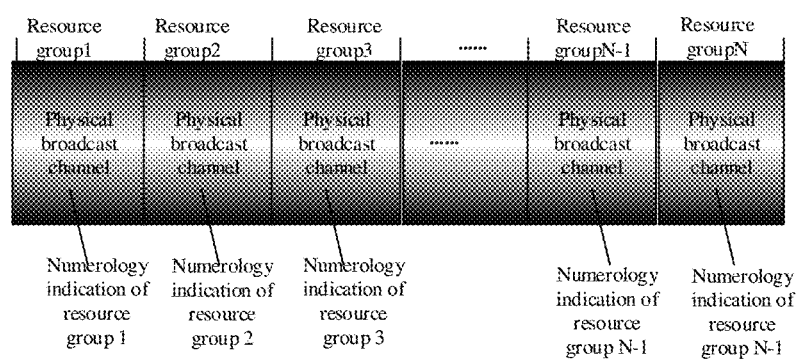
FIG. 15 illustrates a seventh schematic diagram of transmission of a physical layer broadcast or multicast channel according to an embodiment of the disclosure.

FIG. 15 illustrates a seventh schematic diagram of transmission of a physical layer broadcast or multicast channel according to an embodiment of the disclosure. As illustrated in FIG. 15, it is supported in the disclosure that a cell-level numerology indication is notified directly. It may further be supported in the disclosure that corresponding Numerologies are defined by using a virtual sector group level, a port group level, a beam set level, an antenna group level, a time domain resource group level and a frequency domain resource group level. In order to support that numerologies corresponding to different sector groups, port groups, beam sets and antenna groups are different, the notification may be performed by using multiple physical layer broadcast (or multicast) channels. The physical layer broadcast (or multicast) channels are respectively associated with the different resource groups.

Types of the Numerologies include: a length of a time domain symbol, a number of sub-carriers, a sub-carrier density, a sub-carrier spacing, a frequency domain guard band, a time domain guard time length (uplink and downlink guard or radio-frequency beam switching guard), a length of a CP, and the number of points of FFT. In a same resource group, there may be one set of the numerology and may also be multiple sets of the numerology. When there are multiple sets of the numerology, a first case is that the multiple sets of numerology respectively correspond to different types of channel or signals.

In the above manner, it is further implemented in the disclosure that different resource groups have different Numerologies.

The numerology configuration acts on an agreed time range, and the agreed range includes: physical layer time interval units where the physical layer broadcast (or multicast) channels are located; a current radio frame; and all physical layer time interval units from a current transmission of a physical layer broadcast (or multicast) channel to a next transmission of a physical layer broadcast (or multicast) channel.

A terminal may obtain the parameters by receiving the cell-level physical layer broadcast (or multicast) channel or physical layer broadcast (or multicast) channels corresponding to multiple resource groups.

Sixth Embodiment

Figure 16:
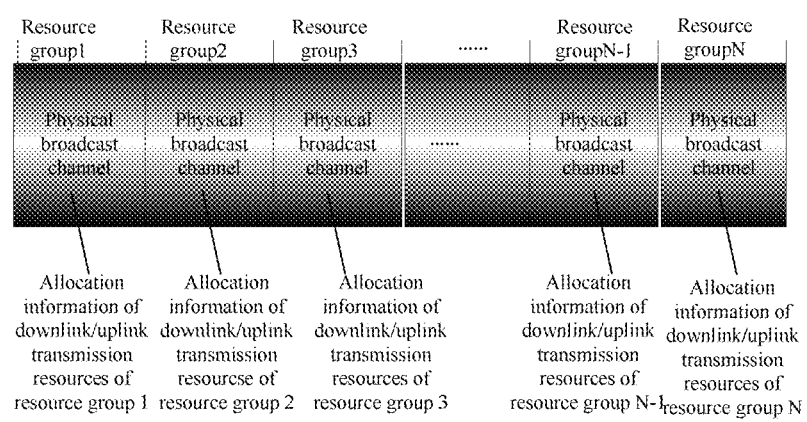
FIG. 16 illustrates an eighth schematic diagram of transmission of a physical layer broadcast or multicast channel according to an embodiment of the disclosure.

FIG. 16 illustrates an eighth schematic diagram of transmission of a physical layer broadcast or multicast channel according to an embodiment of the disclosure. As illustrated in FIG. 16, it is supported in the disclosure that allocation information on downlink transmission resources or uplink transmission resources in a physical layer time interval unit is notified directly. It may further be supported in the disclosure that allocation information of corresponding downlink transmission resources and uplink transmission resources is allocated by using a virtual sector group level, a port group level, a beam set level, an antenna group level, a time domain resource group level and a frequency domain resource group level. In order to support that downlink transmission resources or uplink transmission resources corresponding to different sector groups, port groups, beam sets and antenna groups are allocated differently, the notification may be performed by using multiple physical layer broadcast (or multicast) channels. The physical layer broadcast (or multicast) channels are respectively associated with different resource groups.

In the above manner, it is further implemented in the disclosure that different resource groups have different allocations of the downlink transmission resources and uplink transmission resources. The allocation information on the downlink transmission resources and uplink transmission resources acts on an agreed time range, and the agreed range includes: physical layer time interval units where the physical layer broadcast (or multicast) channels are located; a current radio frame; and all physical layer time interval units from a current transmission of a physical layer broadcast (or multicast) channel to a next transmission of a physical layer broadcast (or multicast) channel A terminal may obtain the parameters by receiving the cell-level physical layer broadcast (or multicast) channel or physical layer broadcast (or multicast) channels corresponding to multiple resource groups.

Seventh Embodiment

Figure 17:
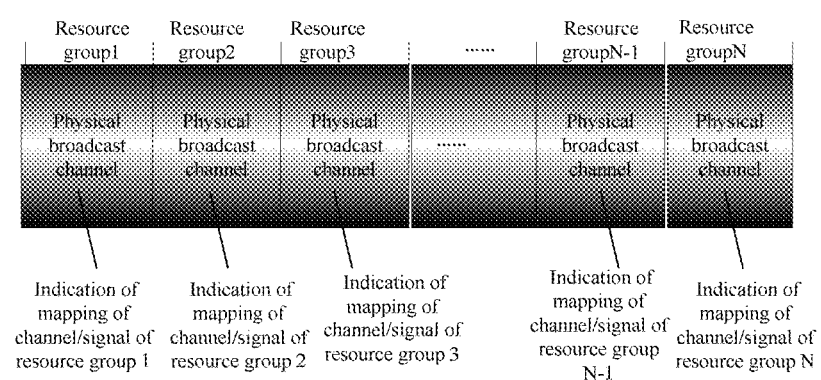
FIG. 17 illustrates a ninth schematic diagram of transmission of a physical layer broadcast or multicast channel according to an embodiment of the disclosure.

FIG. 17 illustrates a ninth schematic diagram of transmission of a physical layer broadcast or multicast channel according to an embodiment of the disclosure. As illustrated in FIG. 17, it is supported in the disclosure that indication information on mapping of a channel or signal in a physical layer time interval unit is notified directly. It may further be supported in the disclosure that indication information on mapping of a corresponding channel or signal is defined by using a virtual sector group level, a port group level, a beam set level, an antenna group level, a time domain resource group level and a frequency domain resource group level. In order to support that channel or signals corresponding to different sector groups, port groups, beam sets and antenna groups are mapped differently, the notification may be performed by using multiple physical layer broadcast (or multicast) channels. The physical layer broadcast (or multicast) channels are respectively associated with the different resource groups.

In the above manner, it is further implemented in the disclosure that different resource groups have different mappings of the channel or signal.

The indication information on the mapping of the channel or signal acts on an agreed time range, and the agreed range includes: physical layer time interval units where the physical layer broadcast (or multicast) channels are located; a current radio frame; and all physical layer time interval units from a current transmission of a physical layer broadcast (or multicast) channel to a next transmission of a physical layer broadcast (or multicast) channel. A terminal may obtain the parameters by receiving the cell-level physical layer broadcast (or multicast) channel or physical layer broadcast (or multicast) channels corresponding to multiple resource groups.

Eighth Embodiment

Figure 18:
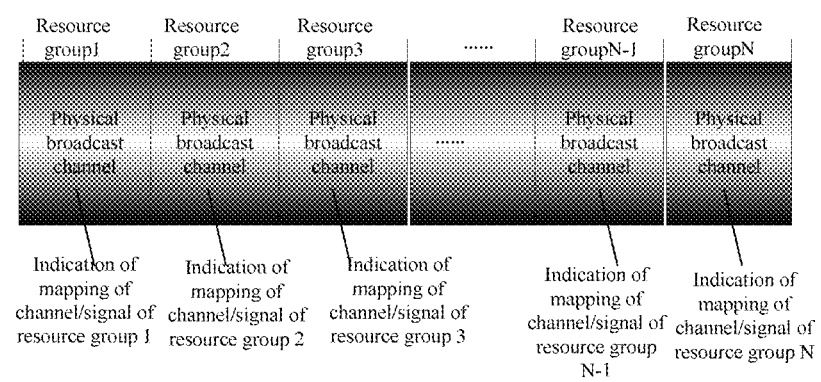
FIG. 18 illustrates a tenth schematic diagram of transmission of a physical layer broadcast or multicast channel according to an embodiment of the disclosure.

FIG. 18 illustrates a tenth schematic diagram of transmission of a physical layer broadcast or multicast channel according to an embodiment of the disclosure. As illustrated in FIG. 18, it is supported in the disclosure that indication information on mapping of a channel or signal in a physical layer time interval unit is notified directly. It may further be supported in the disclosure that indication information on mapping of a corresponding channel or signal is defined by using a virtual sector group level, a port group level, a beam set level, an antenna group level, a time domain resource group level and a frequency domain resource group level. In order to support that channel or signals corresponding to different sector groups, port groups, beam sets and antenna groups are mapped differently, the notification may be performed by using multiple physical layer broadcast (or multicast) channels. These physical layer broadcast (or multicast) channels are respectively associated with the different resource groups.

In the above manner, it is further implemented in the disclosure that the different resource groups have different mappings of the channels or signals. The indication information on the mappings of the channels or signals acts on an agreed time range, and the agreed range includes: physical layer time interval units where the physical layer broadcast (or multicast) channels are located; a current radio frame;

and all physical layer time interval units from a current transmission of a physical layer broadcast (or multicast) channel to a next transmission of a physical layer broadcast (or multicast) channel A terminal may obtain the parameters by receiving the cell-level physical layer broadcast (or multicast) channel or physical layer broadcast (or multicast) channels corresponding to multiple resource groups.

Ninth Embodiment

Figure 19:
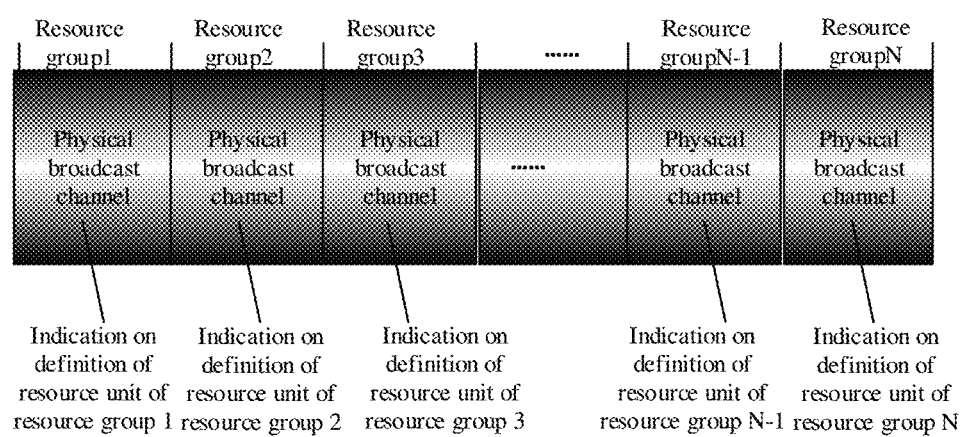
FIG. 19 illustrates an eleventh schematic diagram of transmission of a physical layer broadcast or multicast channel according to an embodiment of the disclosure.

FIG. 19 illustrates an eleventh schematic diagram of transmission of a physical layer broadcast or multicast channel according to an embodiment of the disclosure. As illustrated in FIG. 19, it is supported in the disclosure that indication information on a definition of a resource unit in a physical layer time interval unit is notified directly. It may further be supported in the disclosure that indication information on a definition of a corresponding resource unit is defined by using a virtual sector group level, a port group level, a beam set level, an antenna group level, a time domain resource group level and a frequency domain resource group level. In order to support that definitions of resource units corresponding to different sector groups, port groups, beam sets and antenna groups are different, the notification may be performed by using multiple physical layer broadcast (or multicast) channels. The physical layer broadcast (or multicast) channels are respectively associated with different resource groups.

In the above manner, it is further implemented in the disclosure that different resource groups have different definitions on the resource unit.

Indication information on a definition of a downlink resource unit acts on an agreed time range, and the agreed range includes: physical layer time interval units where the physical layer broadcast (or multicast) channels are located; a current radio frame; and all physical layer time interval units from a current transmission of a physical layer broadcast (or multicast) channel to a next transmission of a physical layer broadcast (or multicast) channel.

A terminal may obtain the parameters by receiving the cell-level physical layer broadcast (or multicast) channel or physical layer broadcast (or multicast) channels corresponding to multiple resource groups. The definition of the resource unit includes a definition of an RB, a definition of an RB G, a definition of a subband, and the like. For example, one RB may include 12 sub-carriers, and may also include 6 sub-carriers or 24 sub-carriers, and multiple definitions are agreed by receiving and transmitting terminals and are indicated by signaling in the physical layer broadcast (or multicast) channel. The RBG or subband may include 4 RBs, 2 RBs or 8 RBs, and multiple definitions are agreed by the receiving and transmitting terminals and are indicated by the signaling in the physical layer broadcast (or multicast) channel.

Tenth Embodiment

Figure 20:
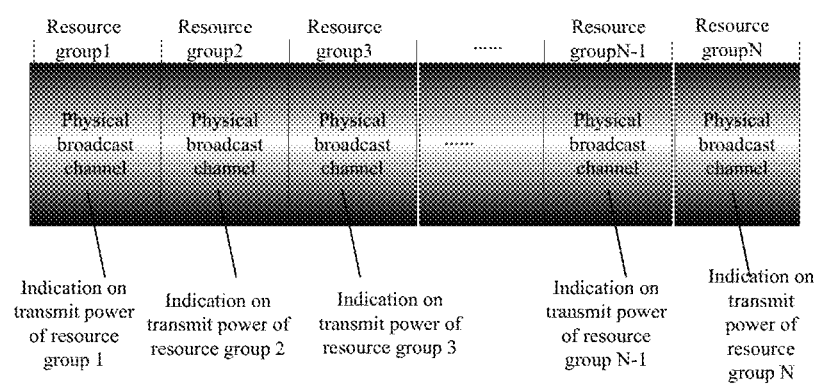
FIG. 20 illustrates a twelfth schematic diagram of transmission of a physical layer broadcast or multicast channel according to an embodiment of the disclosure.

FIG. 20 illustrates a twelfth schematic diagram of transmission of a physical layer broadcast or multicast channel according to an embodiment of the disclosure. As illustrated in FIG. 20, it is further supported in the disclosure that information on a transmit power of a resource included in a corresponding group is notified by using a virtual sector group level, a port group level, a beam set level, an antenna group level, a time frequency resource group level and a frequency domain resource group level. In order to support that transmit powers corresponding to different sector groups, port groups, beam sets and antenna groups, corresponding available bandwidths are different, the notification may be performed by using multiple physical layer broadcast (or multicast) channels. These physical layer broadcast (or multicast) channels are respectively associated with the different sector groups, port groups, beam sets, antenna groups, time domain resource groups and frequency domain resource groups.

In the above manner, it is further implemented in the disclosure that different resource groups have different transmit powers. In this embodiment, configuration parameters not only act on a subframe/time slot/half-frame/radio frame where the physical layer broadcast (or multicast) channel is located, but also may act on an agreed subframe group or time slot group. Or, an agreed action range includes a time slot, a subframe, a half-frame and a radio frame before configuration parameters of an available bandwidth are received in a next time.

A terminal may obtain the parameters by receiving the physical layer broadcast (or multicast) channels corresponding to multiple resource groups. The transmit power may be a transmit power of each of some channels or signals, such as a transmit power of a synchronization signal, and may also be a transmit power corresponding to each of some resources, such as, a transmit power corresponding to a beam, a transmit power on time domain resources, a transmit power on frequency domain transmit resources, a transmit power on a port, and a transmit power on an antenna, etc.

Eleventh Embodiment

Figure 21:
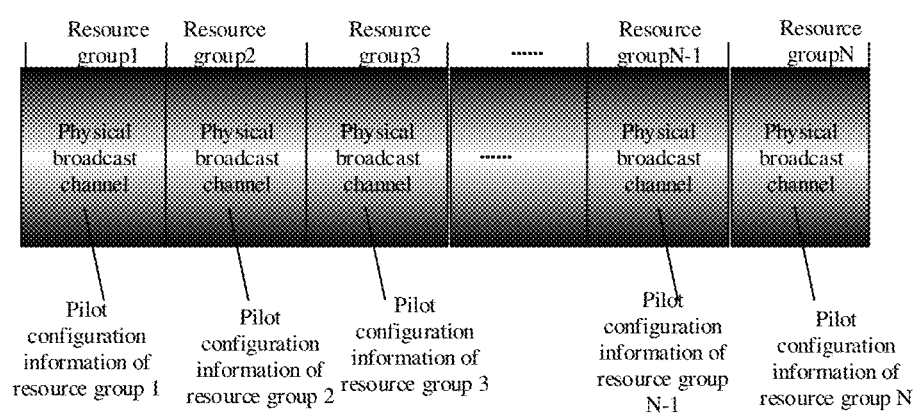
FIG. 21 illustrates a thirteenth schematic diagram of transmission of a physical layer broadcast or multicast channel according to an embodiment of the disclosure.

FIG. 21 illustrates a thirteenth schematic diagram of transmission of a physical layer broadcast or multicast channel according to an embodiment of the disclosure. As illustrated in FIG. 21, it is supported in the disclosure that pilot configuration information in a physical layer time interval unit is notified directly. It may be further supported in the disclosure that pilot configuration information of a resource included in a corresponding group is notified by using a virtual sector group level, a port group level, a beam set level, an antenna group level, a time frequency resource group level and a frequency domain resource group level. In order to support that pilot configurations corresponding to different sector groups, port groups, beam sets and antenna groups are different, the notification may be performed by using multiple physical layer broadcast (or multicast) channels. The physical layer broadcast (or multicast) channels are respectively associated with the different sector groups, port groups, beam sets, antenna groups, time domain resource groups and frequency domain resource groups.

A terminal can obtain the parameters by receiving the physical layer broadcast (or multicast) channels corresponding to multiple resource groups. The pilot configuration includes measurement pilot resources of the time interval unit, such as the number and positions of ports, the number and positions of beams, a size and a position of time frequency resources occupied by a pilot, information such as the number and lengths of code resources used by the pilot may further include a multiplexing manner of measurement pilot such as whether time division multiplexing, frequency division multiplexing, or code division multiplexing is adopted between ports. In addition to configuration information for the measurement pilot, indication information power of the pilot may further indicate configuration information of a reference demodulation pilot.

Twelfth Embodiment

Figure 22:
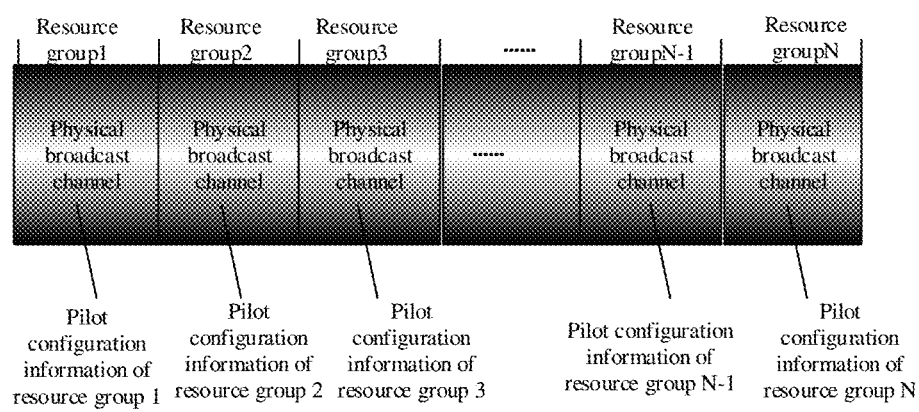
FIG. 22 illustrates a fourteenth schematic diagram of transmission of a physical layer broadcast or multicast channel according to an embodiment of the disclosure.

FIG. 22 illustrates a fourteenth schematic diagram of transmission of a physical layer broadcast or multicast channel according to an embodiment of the disclosure. As illustrated in FIG. 22, it is supported in the disclosure that indication information on a resource allocation manner in a physical layer time interval unit is notified directly. It is further supported in the disclosure that indication information on a resource allocation manner of a resource included in a corresponding group is notified by using a virtual sector group level, a port group level, a beam set level, an antenna group level, a time frequency resource group level and a frequency domain resource group level. In order to support that resource allocation manners corresponding to different sector groups, port groups, beam sets and antenna groups are different, the notification may be performed by using multiple physical layer broadcast (or multicast) channels. The physical layer broadcast (or multicast) channels are respectively associated with the different sector groups, port groups, beam sets, antenna groups, time domain resource groups and frequency domain resource groups.

A terminal may further acquire the above-mentioned physical layer transmission parameters by receiving configuration signaling on each of the physical layer broadcast (or multicast) channels. For example, the indication information on the manner of the resource allocation includes allocation of time domain resources, allocation of frequency domain resources and allocation of time frequency resources. For example, in one manner, when a data channel or a control channel is transmitted, only the allocation of time domain resources is performed in an agreed physical layer time interval unit and the frequency domain resources fully occupy the available frequency domain resources. In another manner, when a data channel or a control channel is transmitted, only allocation of the frequency domain resources is performed in the agreed physical layer time interval unit, and the time domain resources always occupy time resources corresponding to the physical layer time interval units. In another manner, when a data channel or a control channel is transmitted, joint allocation of time domain and frequency domain resources needs to be performed in the agreed physical layer time interval unit.

Thirteenth Embodiment

In the foregoing embodiments, it is exemplified mainly the condition in which the above-mentioned physical layer transmission parameters are configured by the physical layer broadcast (or multicast) channels. Such a manner is flexible, but the overhead is large. In another manner, the physical layer transmission parameters are configured by using the higher layer signaling, and the terminal obtains the parameters by detecting the higher layer signaling. Such a manner is suitable for a UE not accessed initially. In addition, when another sub-carrier or cell has established a link with the UE, the above-mentioned configuration of some physical layer transmission parameters may be performed via another sub-carrier.

The terminal may further acquire the above-mentioned physical layer transmission parameters via a sequence or a sending position used by the synchronization signal. For example,

| | | |
|---|---|---|
| A synchronization sequence pertains to a sequence group 1 | A type A of a physical layer transmission parameter is a1 | A type B of a physical layer transmission parameter is b1 |
| A synchronization sequence pertains to a sequence group 2 | A type A of a physical layer transmission parameter is a2 | A type B of a physical layer transmission parameter is b2 |
| ... | ... | ... |
| A synchronization sequence pertains to a sequence group N | A type A of a physical layer transmission numerology is an | A type B of a physical layer transmission numerology is bn |

Or a value of each of different physical layer transmission parameters is explicitly indicated by using different positions of the synchronization sequence.

An embodiment of the disclosure further provides a storage medium, which includes a stored program, and the above program, when being operated, executes the above-mentioned any one method.

Optionally, in an optional embodiment, the storage medium may be configured to store a program code for executing the following operations.

At S1, transmission resources are divided into N resource groups, where N is greater than or equal to 1.

At S2, a first type of physical layer transmission parameters are defined, where the first type of physical layer transmission parameters include at least one of the following:

indication information on a definition of a basic resource unit;

indication information on aggregation of physical layer time interval units;

information on configuration parameters of a basic transmission structure;

numerology configuration information;

indication information on mapping of a channel or signal;

indication information on a manner of resource allocation;

indication information on an available bandwidth in a frequency domain of each of resource groups;

indication information on a transmit power of a resource; or measurement pilot configuration information.

The first type of physical layer transmission parameters corresponding to the N resource groups are notified to a receiving terminal.

In another optional embodiment, the storage medium may further be configured to store a program code for further executing the following operations.

At S1, N resource groups are determined, where N is greater than or equal to 1.

At S2, a first type of physical layer transmission parameters corresponding to the N resource groups are received, where the first type of physical layer transmission parameters include at least one of the following:

indication information on a definition of a basic resource unit;

indication information on aggregation of physical layer time interval units;

information on configuration parameters of a basic transmission structure;

numerology configuration information;

indication information on mapping of a channel or signal;

indication information on a manner of resource allocation;

indication information on an available bandwidth in a frequency domain of each of resource groups;

indication information on a transmit power of a resource; or measurement pilot configuration information.

Optionally, in this embodiment, the above storage medium may include but may not be limited to: various media capable of storing the program code such as a U disk, an ROM, an RAM, a portable hard disk, a magnetic disk or an optical disk.

It is apparent that, those skilled in the art should understand that each module or each step of the disclosure may be implemented by a general computing device. The modules or steps may be concentrated on a single computing device or distributed on a network formed by two computing devices. Optionally, the modules or the steps may be implemented by program codes executable by the computing devices, so that the modules or steps may be stored in a storage device to be executed by the computing devices. Moreover, the illustrated or described steps may be executed in an order different from that here in some cases, or may be fabricated into individual integrated circuit modules respectively, or two of the modules or steps may be fabricated into a single integrated circuit module for implementation. Therefore, the disclosure is not limited to any specific combination of hardware and software.

The above descriptions are only the preferred embodiments of the disclosure and are not intended to limit the disclosure. For those skilled in the art, the disclosure may have various modifications and variations. Any modification, equivalent substitution, improvement and the like made within the principle of the disclosure shall fall within the scope of protection of the disclosure.

INDUSTRIAL APPLICABILITY

The embodiments of the disclosure are applied to the field of communication. The transmission resources are divided into the N resource groups, the first type of physical layer transmission parameters are determined, and the first type of physical layer transmission parameters corresponding to the N resource groups are notified to the receiving terminal, thereby the problem that the first type of physical layer transmission parameters cannot be flexibly configured in the related art is solved, and the parameters can be flexibly configured for the different UEs.

The invention claimed is:

1. A method for configuring physical layer transmission parameters, comprising:
dividing transmission resources into N resource groups, where N is greater than or equal to 1;
determining a first type of physical layer transmission parameters, wherein
the first type of physical layer transmission parameters comprises at least one of the following:
indication information on a definition of a basic resource unit;
indication information on aggregation of physical layer time interval units;
information on configuration parameters of a basic transmission structure;
numerology configuration information;
indication information on mapping of a channel or signal;
indication information on a manner of resource allocation;
indication information on an available bandwidth in a frequency domain of each of the resource groups;
indication information on a transmit power of a resource; or
measurement pilot configuration information; and
notifying a receiving terminal of respective first type of physical layer transmission parameters respectively corresponding to the N resource groups;

wherein the method further comprises: transmitting configuration information through M physical layer broadcast or multicast channels, wherein the M physical layer broadcast or multicast channels are associated with the N resource groups correspondingly, and configuration information notified in each of the M physical layer broadcast or multicast channels acts on an associated resource group, where N is greater than or equal to M, M is greater than or equal to 1, and each of M and N is an integer.

2. The method of claim 1, wherein notifying the receiving terminal of the first type of physical layer transmission parameters corresponding to the N resource groups comprises:
notifying the receiving terminal of the first type of physical layer transmission parameters corresponding to the N resource groups in physical layer broadcast or multicast channels; or,
notifying the receiving terminal of the first type of physical layer transmission parameters corresponding to the N resource groups via higher layer signaling.

3. The method of claim 1, wherein the method further comprises:
determining a first type of physical layer transmission parameters of a first cell or carrier; and
notifying the receiving terminal of the first type of physical layer transmission parameter of the first cell or carriers on a second cell or communication carrier.

4. The method of claim 1, wherein the method further comprises:
indicating the first type of physical layer transmission parameters via sequence resources or time frequency resources used by a synchronization channel.

5. The method of claim 1, wherein the configuration information notified in the physical layer broadcast or multicast channel comprises at least one of:
indication information on division of the N resource groups; or
index information of the associated resource group.

6. A method for acquiring physical layer transmission parameters, comprising:
determining N resource groups, wherein N is greater than or equal to 1; and
receiving respective first type of physical layer transmission parameters respectively corresponding to the N resource groups, wherein a first type of physical layer transmission parameter of
the respective first type of physical layer transmission parameters comprises at least one of the following:
indication information on a definition of a basic resource unit;
indication information on aggregation of physical layer time interval units;
information on configuration parameters of a basic transmission structure;
numerology configuration information;
indication information on mapping of a channel or signal;
indication information on a manner of resource allocation;
indication information on an available bandwidth in a frequency domain of each of resource groups;
indication information on a transmit power of a resource; or
measurement pilot configuration information;
wherein the method further comprises: receiving configuration information from M physical layer broadcast or multicast channels, wherein the M physical layer broadcast or multicast channels are associated with the N resource groups correspondingly, and configuration information notified in each of the M physical layer broadcast or multicast channels acts on an associated resource group, where N is greater than or equal to M, M is greater than or equal to 1, and each of M and N is an integer.

7. The method of claim 6, wherein the receiving the first type of physical layer transmission parameters corresponding to the N resource groups comprises:
receiving the first type of physical layer transmission parameters corresponding to the N resource groups in physical layer broadcast or multicast channels; or
acquiring the first type of physical layer transmission parameters corresponding to the N resource groups by detecting higher layer signaling.

8. The method of claim 6, wherein the method further comprises:
receiving the first type of physical layer transmission parameters corresponding to the N resource groups on a second cell or communication carrier.

9. The method of claim 6, wherein the method further comprises:
detecting sequence resources or time frequency resources used for transmitting a synchronization signal, and determining the first type of physical layer transmission parameters according to the sequence resources or the time frequency resource used by the synchronization signal.

10. The method of claim 6, wherein the configuration information notified in the physical layer broadcast or multicast channels comprises at least one of:
indication information on division of the N resource groups; or
index information of the associated resource group.

11. An apparatus for configuring physical layer transmission parameters, comprising:
a processor; and
a memory storing instructions, which, when executed by the processor, cause the processor to execute operations comprising:
dividing transmission resources into N resource groups, where N is greater than or equal to 1, and determining a first type of physical layer transmission parameters, wherein
the first type of physical layer transmission parameters comprises at least one of the following:
indication information on a definition of a basic resource unit;
indication information on aggregation of physical layer time interval units;
information on configuration parameters of a basic transmission structure;
numerology configuration information;
indication information on mapping of a channel or signal;
indication information on a manner of resource allocation;
indication information on an available bandwidth in a frequency domain of each of resource groups;
indication information on a transmit power of a resource; or
measurement pilot configuration information; and
notifying a receiving terminal of respective first type of physical layer transmission parameters respectively corresponding to the N resource groups;

wherein the processor is further configured to execute operations comprising:
transmitting configuration information through M physical layer broadcast or multicast channels, wherein the M physical layer broadcast or multicast channels are associated with the N resource groups correspondingly, and configuration information notified in each of the M physical layer broadcast or multicast channels acts on an associated resource group, where N is greater than or equal to M, M is greater than or equal to 1, and each of M and N is an integer.

12. The apparatus of claim 11, wherein the processor is further configured to execute operations comprising:
notifying the receiving terminal of the first type of physical layer transmission parameters corresponding to the N resource groups in physical layer broadcast or multicast channels; or,
notifying the receiving terminal of the first type of physical layer transmission parameters corresponding to the N resource groups via higher layer signaling.

13. The apparatus of claim 11, wherein the processor is further configured to execute operations comprising:
determining a first type of physical layer transmission parameters of a first cell or carrier, and notifying the receiving terminal of the first type of physical layer transmission parameter of the first cell or carrier on a second cell or communication carrier; or
indicating the first type of physical layer transmission parameters via sequence resources or time frequency resources used by a synchronization channel.

14. The apparatus of claim 11, wherein
the configuration information notified in the physical layer broadcast or multicast channels comprises at least one of:
indication information on division of the N resource groups; or
index information of the associated resource group.

15. An apparatus for acquiring physical layer transmission parameters, comprising:
a processor; and
a memory storing instructions, which, when executed by the processor, cause the processor to execute operations comprising:
determining N resource groups, where N s greater than or equal to 1; and
receiving respective first type of physical layer transmission parameters respectively corresponding to the N resource groups, wherein a first type of physical layer transmission parameter of
the respective first type of physical layer transmission parameters comprises at least one of the following:
indication information on a definition of a basic resource unit;
indication information on aggregation of physical layer time interval units;
information on configuration parameters of a basic transmission structure;
numerology configuration information;
indication information on mapping of a channel or signal;
indication information on a manner of resource allocation;
indication information on an available bandwidth in a frequency domain of each of resource groups;
indication information on a transmit power of a resource; or
measurement pilot configuration information;

wherein the processor is further configured to execute operations comprising:

receiving configuration information from M physical layer broadcast or multicast channels, wherein the M physical layer broadcast or multicast channels are associated with the N resource groups correspondingly, and configuration information notified in each of the M physical layer broadcast or multicast channels acts on an associated resource group, where N is greater than or equal to M, M is greater than or equal to 1, and each of M and N is an integer.

16. The apparatus of claim 15, wherein the processor is further configured to execute operations comprising:

receiving the first type of physical layer transmission parameters corresponding to the N resource groups in physical layer broadcast or multicast channels; or acquiring the first type of physical layer transmission parameters corresponding to the N resource groups by detecting higher layer signaling.

17. The apparatus of claim 15, wherein the processor is further configured to execute operations comprising:

receiving the first type of physical layer transmission parameters corresponding to the N resource groups on a second cell or communication carrier; or detecting sequence resources or time frequency resources used for transmitting a synchronization signal, and determining the first type of physical layer transmission parameters according to the sequence resources or the time frequency resource used by the synchronization signal.

18. The apparatus of claim 15, wherein the configuration information notified in the physical layer broadcast or multicast channel comprises at least one of:

indication information on division of the N resource groups; or index information of the associated resource group.

* * * * *